Nov. 13, 1934.　　　　O. B. ANDREWS　　　　1,980,843
BREAD BAND
Filed Dec. 7, 1932
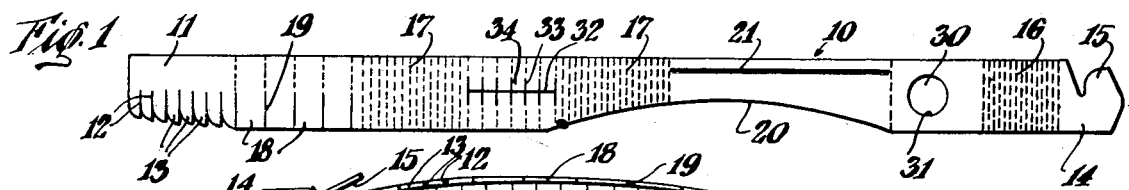
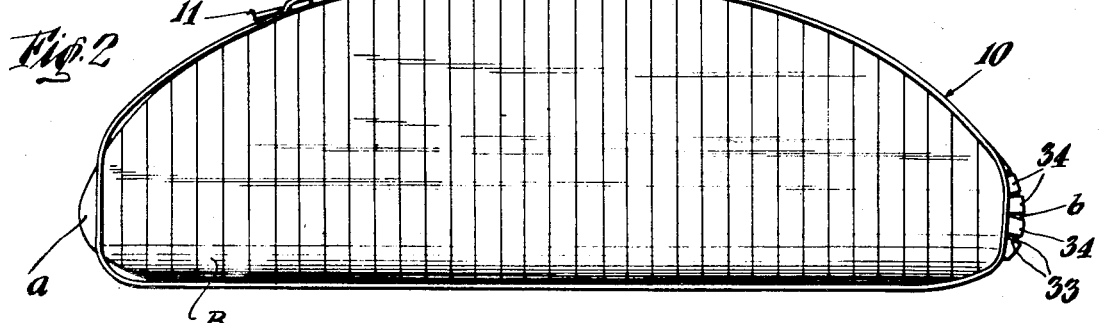
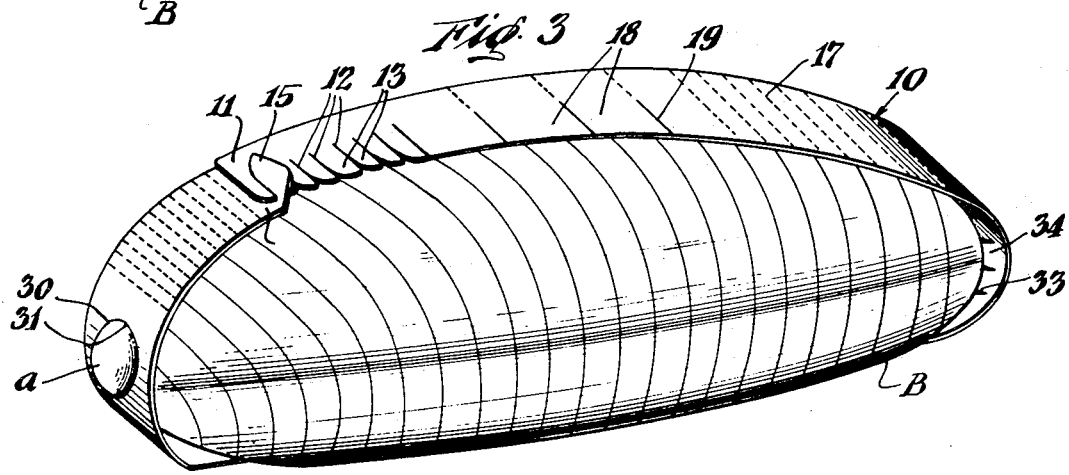
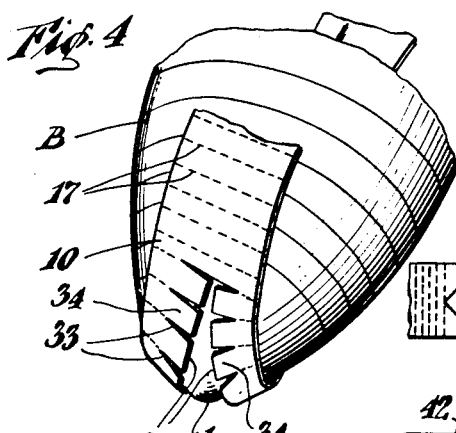
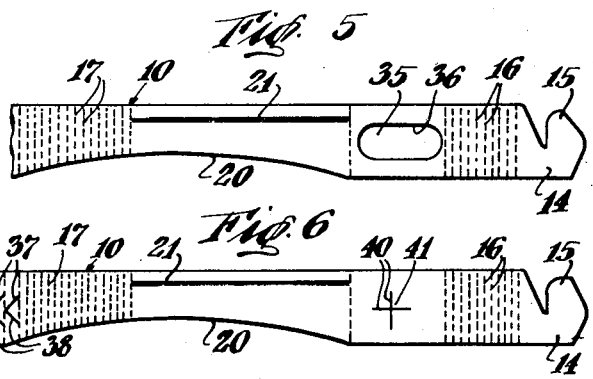
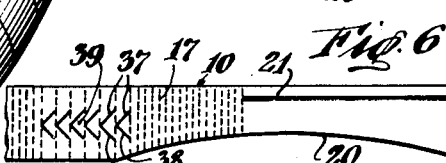
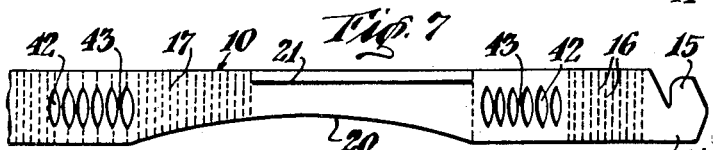
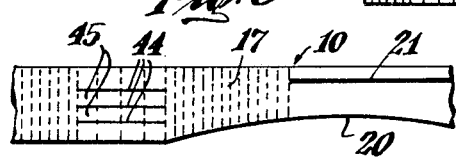
INVENTOR
Oliver B. Andrews
BY
ATTORNEYS Patented Nov. 13, 1934

1,980,843

UNITED STATES PATENT OFFICE

1,980,843

BREAD BAND

Oliver B. Andrews, Chattanooga, Tenn.

Application December 7, 1932, Serial No. 646,073

5 Claims. (Cl. 24—17)

This invention relates to bread bands for retaining sliced loaves of bread in their original form and more particularly to an improved adjustable band which is adapted to extend around sliced loaves having pointed, uneven or irregular ends.

In the improved bread band of the present invention, means are provided for adjusting the band to fit loaves of various sizes and to fit partial loaves after some slices have been removed, so that the remaining slices will be held in firm, compact position.

An object of this invention is to provide an improved band which is particularly adapted for binding together sliced loaves which present pointed, irregular or uneven ends and contours, as is found, for example, in hearth loaves or loaves not baked in a tray or a pan.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a face view of a bread band in extended position;

Fig. 2 is a side view of a loaf of sliced bread showing the improved band in place thereon;

Fig. 3 is a perspective view of a loaf of sliced bread and associated bread band;

Fig. 4 is a fragmentary perspective view of a sliced loaf illustrating particularly the manner in which my improved band grips and adjusts itself to loaves having irregular or pointed end contours;

Fig. 5 is a face view of a band having modified means for retaining the same in position on the loaf;

Fig. 6 is a face view of a bread band showing a further modification of loaf gripping means;

Fig. 7 is a face view of a bread band showing a slight further modification of loaf gripping means; and Fig. 8 is a face view of a bread band showing a slight further modification of loaf gripping means.

Like reference characters denote like parts in the several figures of the drawing.

In the following description and in the claims, various details will be identified by specific names for convenience, but they are intended to be as generic in their application as the art will permit.

Referring to the drawing more in detail, the invention is shown as applied to a band 10 adapted to encircle a loaf B of sliced bread. The band is shown in detail in Fig. 1 and comprises, generally, a long strip of paper or fibreboard provided at one end 11 with a plurality of slots 12 which form tongues 13 therebetween. The other end 14 is provided with a hook portion 15 adapted to interlockingly engage with any one of the tongues 12 when the band is wrapped around a sliced loaf. Score lines 16 and 17 are provided, at the end 14 and at the intermediate portion of the band respectively, to permit the band to snugly fit the loaf. Auxiliary tongues 18 defined by the spaced cuts 19 are formed in the end 11 between the body of the band and the tongues 13. An arcuate cutout portion 20 and a crimp line 21 may be provided longitudinally of the main portion of the band to insure a close fit between the band and the bottom of the loaf. The foregoing description comprises the general features of my bread band as more particularly disclosed and claimed in my application, Serial No. 568,893, filed October 15, 1931, now Patent No. 1,896,602, dated February 7, 1933.

The present invention is concerned with the provision of a bread band especially adapted in the packaging of sliced loaves which present uneven, irregular and pointed ends or contours. Bread bands heretofore made have not been adapted for use in connection with uneven or irregular loaves due to the fact that bands would not retain themselves thereon or perform their desired function. In providing a band especially adapted for service in connection with irregular loaves, applicant has adopted the general principles of the band as disclosed in his copending application above identified with certain modifications and changes which will now be described.

As a general rule, it is convenient to have the hook portion 15 positioned near one end of the loaf B so that only one end of the wrapper surrounding the loaf need be opened to remove slices therefrom. In order to fix the hook end of the band in the desired position at one end of the loaf and to retain the band in position on the loaf, an opening 30, which may be circular, rectangular, oblong, or other shape, is cut into the end portion 14 thereof, as shown more particularly in Figs. 1, 2 and 3. The opening 30 is of such size as to receive the pointed end $a$ of the sliced loaf B, as shown more particularly in Figs. 2 and 3. The edges 31 of the opening 30 grip the end of the loaf in such a manner as to firmly retain the end portion 14 of the band in the desired position upon the loaf.

To permit adjustability of the band and to accommodate loaves of various lengths and sizes, means are provided at the intermediate portion of the band to adjustably grip various sized loaves to retain the band thereon. These means, shown in Fig. 1, may comprise a cut 32 which extends longitudinally through the intermediate portion of the band and a series of transverse cuts 33 within the edges of the band and transversely of the longitudinally extending cut 32. A series of tab portions 34 are thus provided which are expansible outwardly. The transverse cuts 33 are so arranged that one or more of them will extend across the extreme end of the loaf when the band is applied thereto, as shown in Fig. 4. When thus arranged, the opposite end of the loaf b will partially project itself through the longitudinal cut 32 and the tab portions 34 opposite the extreme end of the pointed loaf will extend themselves outwardly so as to permit the extreme end of the loaf b to protrude therethrough and be gripped by the edges of the tab portions 34. The longitudinal cut 32 and the transverse cuts 33 extend a sufficient distance along the intermediate portion of the band to permit the band to be used on loaves of bread of various circumferences and take care of the necessary adjustability occasioned by the variations in size resulting during the packing operation.

It will be noted that the edge 31 of the opening 30 at one end of the band and the tabs 34 provided in the intermediate portion of the band grip opposite ends of the loaf to firmly retain the band thereon. The spaced score lines 17 permit the band to adjust itself to the contour of the loaf at all stages of packaging or use. When the slices are removed at the end a of the loaf, the hook portion 14 of the band may be readjusted and engage with any one of the tongues 12 or the tabs 18 as found convenient. For purposes of illustration only, I have shown in Fig. 5 an opening 35 of oblong shape, the edges 36 of which are adapted to grip one end A of the loaf.

A further modification of loaf gripping device is shown in Fig. 6 which comprises a pair of crossed cuts 40 which define pointed tabs 41 therebetween which are adapted to grip the end of the loaf A when the same is partially inserted through the cuts. To accommodate loaves of different size, I have shown in Fig. 6 a modified arrangement adapted to adjustably grip the other end b of the loaf. This modified arrangement comprises cuts 37 and 38 arranged in V-notch formation and defining straps 39 therebetween. The cuts 37 and 38 permit the straps 39 to expand in such manner as to permit a portion of the end b of the loaf to project therethrough and be gripped thereby.

As a further modification, I have shown in Fig. 7 a plurality of almond shaped openings 42 defining straps 43 therebetween at the end portion 14 and at the intermediate portion of the band. These openings are so arranged so as to permit the ends a and b of the loaf to partially insert themselves there into so that the ends will be gripped by the straps 43 and the band retained in position thereon.

Figure 8 is a still further modification of adjustable means positioned at the intermediate portion of the band and adapted to grip ends a and b of the loaf. This modified form comprises a plurality of longitudinally extending cuts 44 defining straps 45 therebetween. The straps 45 are flexible and expansible to permit the end of the loaf to extend partially therethrough.

It is understood that the bread band above disclosed is preferably made of flexible paperboard but may also be made of waxed or sheet paper or other material adaptable for the purpose. The band may also be made in any width or length to accommodate the loaf to which it is to be associated and the hook 15, tongues 12 and 18, the score lines 16 and 17 and the arcuate cutout 20, may be arranged in any manner suitable to most effectively accommodate the sliced loaf to be wrapped. Similarly, the opening 30 at the end 14 of the band and the expansible parts at the intermediate portion of the band may be made of any regular or irregular shape and may be interchanged or otherwise made and shaped to most effectively perform the purpose of gripping the loaf and retaining the band in its proper position upon the sliced loaf.

While the band above described is particularly adapted for the banding together of irregular, uneven and pointed loaves, such as are common in loaves of rye bread, French bread, Jewish bread, hearth bread or other types of loaves not baked in trays or pans, it is understood that this invention may also be used and adapted for the packaging of bakery products both regular and irregular in outline, such as rolls, cakes and cookies. It is therefore, understood that the application of the improved bread band herein disclosed is not limited to sliced bread alone.

While certain novel features of the invention have been disclosed and are pointed out in the annexed claims, it will be understood that various omissions, substitutions and changes may be made by those skilled in the art without departing from the spirit of the invention.

What is claimed is:

1. A band adapted to encircle sliced bread to hold the same in loaf assembled form, said band having an opening surrounded by adjustable means adjacent an end of the loaf adapted to receive an end of the loaf and frictionally engage the loaf to retain the band in operative position thereon.

2. A bread band adapted to encircle irregularly shaped sliced loaves to hold the same in loaf assembled form, said band having an opening surrounded by adjustable edge portions adapted to receive an end of the loaf and grip the end portion of the loaf to retain the band in operative position thereon.

3. A bread band adapted to encircle irregularly shaped sliced loaves to hold the same in loaf assembled form, said band having an opening adjacent one end of the loaf adapted to frictionally engage the same and another opening having adjustable means along the edges thereof adapted to adjustably receive the other end of the loaf to retain the band in operative position thereon.

4. A bread band adapted to encircle irregularly shaped sliced loaves to hold the same in loaf assembled form, said band having an opening with edge portions surrounding and gripping one end of the loaf, and another opening having adjustable means along the edges thereof adapted to adjustably receive the other end of the loaf to retain the band in operative position thereon.

5. A bread band adapted to encircle irregularly shaped sliced loaves to hold the same in loaf assembled form, said band having adjustable means at the ends thereof permitting adjustment of the band, an opening in said band having edge portions adapted to frictionally grip one end of the loaf, and another opening in said band having adjustable means along the edges thereof adapted to adjustably receive the other end of the loaf to retain the band in operative position thereon.

OLIVER B. ANDREWS.